J. B. CROSBY.
Assignor, by mesne assignments, to G. McKay & J. W. Brooks, trustees.
NAILING OR PEGGING MACHINE.
No. 10,482. Reissued May 27, 1884.
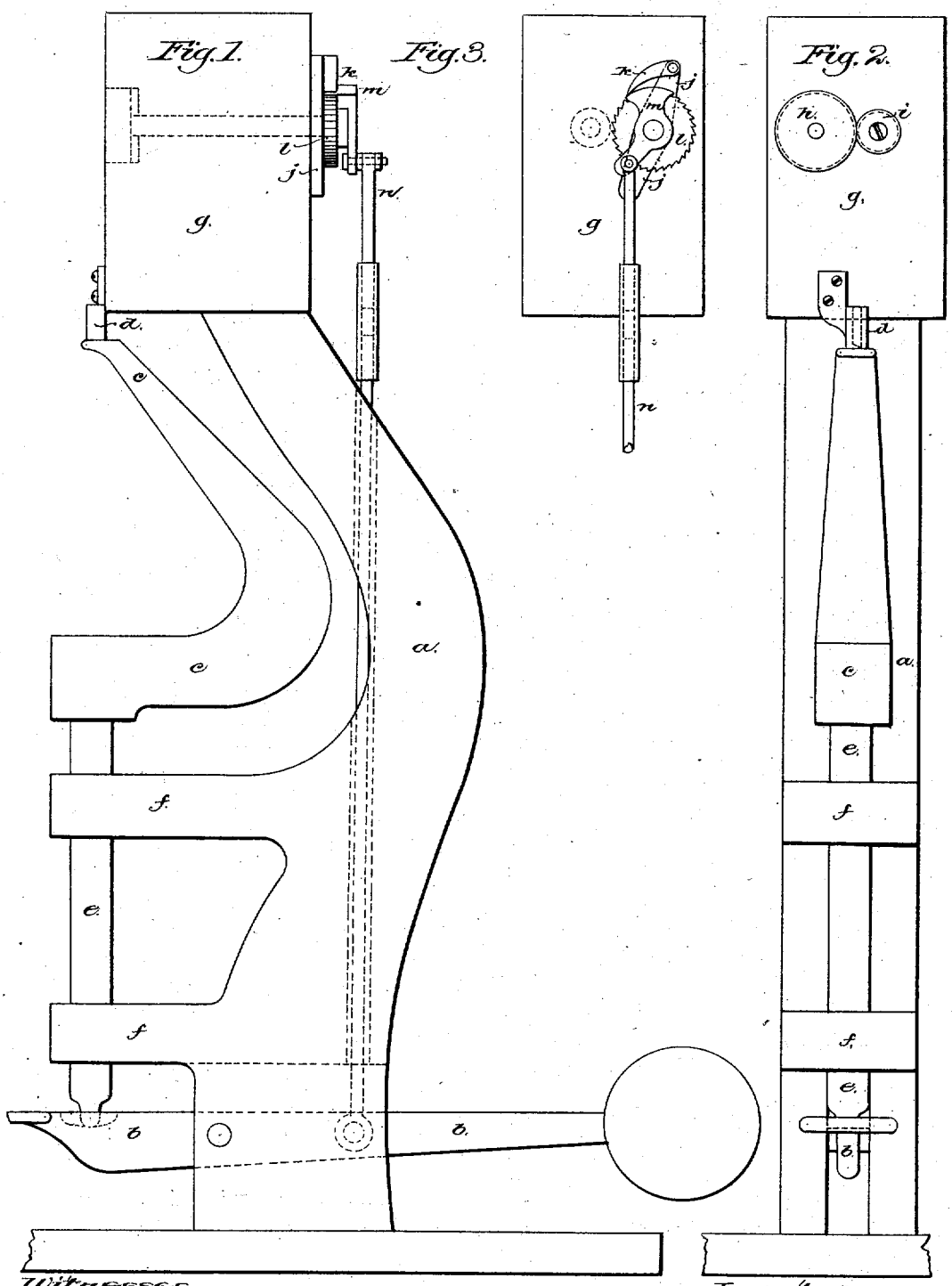
Witnesses.
John F. C. Frankfurt.
A. Hunemwadel
Inventor:
Joseph B. Crosby
by Crosby & Gregory attys.
N. PETERS, Photo-Lithographer, Washington, D. C.

UNITED STATES PATENT OFFICE.

JOSEPH B. CROSBY, OF BOSTON, ASSIGNOR, BY MESNE ASSIGNMENTS, TO GORDON McKAY AND JAMES W. BROOKS, TRUSTEES, OF CAMBRIDGE, MASS.

NAILING OR PEGGING MACHINE.

SPECIFICATION forming part of Reissued Letters Patent No. 10,482, dated May 27, 1884.

Original No. 87,473, dated March 2, 1869; Reissue No. 4,975, dated July 16, 1872. Application for reissue filed December 15, 1883.

*To all whom it may concern:*

Be it known that I, JOSEPH B. CROSBY, of Boston, Suffolk county, in the State of Massachusetts, have invented Improvements in Soling Boots and Shoes, of which the following is a specification.

In that class of machines designed for making use of wire-like material, from which short lengths are cut and driven into the soles of boots and shoes to secure them to their vamps, it is a desideratum to cut, before driving, each fastening from the wire-like material of a length proportioned to the thickness of the material where the fastening is inserted, in order to prevent waste of the pegging or nailing material, to save labor in getting rid of inwardly-projecting peg or nail ends, and to leave the inner surface of the inner sole smooth and free from projections. I accomplish this by making use of what is well known in sole-sewing machines as a "horn," modifying it so that its salient end is solid, like an anvil-face, and arranging the horn so that it can move toward and from the presser-foot or the end of the nail or peg tube of a pegging or nailing mechanism, and so that the thickness of the sole of a boot or shoe is calipered between the horn end and the end of the peg or nail tube or the presser-foot, the horn receiving and resisting the blows or thrusts necessary for the insertion of the pegs or nails, and being so arranged and connected with the mechanism which feeds the wire-like pegging or nailing material as to vary the successive feeding movements of the wire, and cause them to supply to the cutting and driving mechanism lengths corresponding to the varying thickness of the sole at the parts that are brought successively over the end of the horn, which is inserted in the boot or shoe with its anvil-face bearing against the inner surface of the inner sole.

In the drawings, Figure 1 shows in side elevation a machine embodying my invention, Fig. 2 being a front elevation of the machine, and Fig 3 being a partial rear elevation of the same.

*a* represents the standard of a nailing or pegging machine adapted to cut from wire-like material pieces of short length to be forced into soles in the construction of boots and shoes; but, in place of the jack adapted to carrying and properly presenting a last covered with a boot or shoe to the peg or nail driver, I mount on the weighted lever *b*, to which said jack was formerly attached, a horn, *c*, so that the horn end can be moved toward and from the end of the peg or nail tube or the presser-foot *d*. The horn is fixed on the shaft *e*, which is guided in bearings *f f*, fixed to the standard *a*, the lower end of the horn-shaft being stepped in a groove in the weighted lever *b*. In the head *g* of the pegging or nailing machine are journaled two parallel shafts, on which are fixed two grooved wheels, *h i*, so that when the wire-like material, which is preferably supplied from a reel attached to the machine, is introduced into the bite of the grooved wheels, it will be fed down to the cutters when motion is given to the wheels *h i* or either of them in the proper direction. On the other end of the shaft of wheel *h* is pivoted an arm, *j*, one end of which is vibrated at the proper times and to the necessary extent by connection with the shaft which works the pegging or nailing mechanism, which is not shown, as it constitutes no part of my present invention. To the other end of arm *j* is pivoted a pawl, *k*, which meshes into and turns a ratchet-wheel, *l*, fixed on the shaft of the wheel *h*. There is also pivoted on said shaft a shield, *m*, which projects over part of the ratchet-wheel teeth, so that if any part of the projection comes beneath the end of the pawl in its stroke the action of the pawl on the ratchet-wheel is diminished. The shield *m* has an arm, by which, through the link *n*, it is connected to the weighted lever *b*, so that the position of the part of the shield which projects over the ratchet-teeth with reference to the pawl is dependent upon the position of the horn with reference to the tube or presser *d*. To adjust the parts thus working in combination, the link *n* is made adjustable in length, and is also made adjustable as to the distance of its connection from the axis about which the shield turns. It will be seen that as the horn end approaches the end of tube or presser

*d* the shield is advanced under the pawl, thus lessening the length of the wire fed to the sole, and as the horn end is removed from the tube end the shield recedes under the pawl, thus increasing the feeding movement of the wheel *h* and the length of the wire supplied to the sole.

By suitable adjustments by means described, the feed of the wire-like material can be made equal to the distance between the ends of the horn and tube, or slightly in excess or in diminution of such distances.

I claim—

The combination of the vertically-moving horn with the feeding mechanism of the wire-like material, so that the feed of said material shall be in proportion to the thickness of the stock at the points at which fastenings are to be inserted, substantially as described.

JOSEPH B. CROSBY.

Witnesses:
G. W. GREGORY,
B. J. NOYES.